March 17, 1964 E. E. MALLORY ETAL 3,125,481
PLY STITCHING DEVICE

Filed May 16, 1961 2 Sheets-Sheet 1

*INVENTORS*
EDWIN E. MALLORY &
BY ARMINDO CANTARUTTI

*Oberlin, Maky & Donnelly*
ATTORNEYS

INVENTORS
EDWIN E. MALLORY &
ARMINDO CANTARUTTI
BY
Oberlin, Maky & Donnelly
ATTORNEYS

United States Patent Office 3,125,481
Patented Mar. 17, 1964

3,125,481
PLY STITCHING DEVICE
Edwin E. Mallory and Armindo Cantarutti, both of Cuyahoga Falls, Ohio, assignors to National Rubber Machinery Company, Akron, Ohio, a corporation of Ohio
Filed May 16, 1961, Ser. No. 110,457
5 Claims. (Cl. 156—408)

The present invention relates generally as indicated to a ply stitching device and more particularly to a simple form of ply stitching device arranged to stitch together layers of tire body plies that extend axially beyond the ends or shoulders of a tire building drum around which such plies are wrapped.

At the present time there is a trend in the tire industry to provide higher ply locks partly, at least, due to omission of the usual flippers from the tire beads. Thus, higher ply locks are necessitated in order to retain desired strength in the finished tire in the areas of the beads. Accordingly, with the wider ply overhangs beyond the shoulders or ends of the tire building drum, it becomes necessary that the plies be stitched together where they overhang the drum shoulders in order to avoid so-called "pin wrinkles" during the turnover of the plies around the tire beads, such "pin wrinkles" being small wrinkles about the size of straight pins which usually extend axially of the drum.

In tire building machines it is conventional practice to employ a circular series of radially outwardly movable fingers at each end of the drum which turn up or flare out the body plies around the tire bead for pressing thereagainst by other implements such as the usual ply turnup rolls. With such finger-type ply flaring device it is not feasible to employ cylindrical drum extensions for stitching together the axially overhanging plies.

Accordingly, it is a principal object of this invention to provide a simplified form of ply stitching device which may be readily attached to existing tire building machines and which, when the ply stitching operation has been completed, may be withdrawn out of the way for performance of succeeding tire building operations.

It is another object of this invention to provide a ply stitching device which is used in conjunction with tread stitching disks for stitching together the axially overhanging ends of the plies that are wrapped around the tire building drum.

It is another object of this invention to provide a ply stitching device that makes possible the building of a tire by the "single ply" method at great savings and without sacrifice in quality.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

In said annexed drawings:

FIG. 9 is a fragmentary cross-section view showing a typical flipperless tire bead which necessitates the higher ply locks previously referred to.

Figure 1:
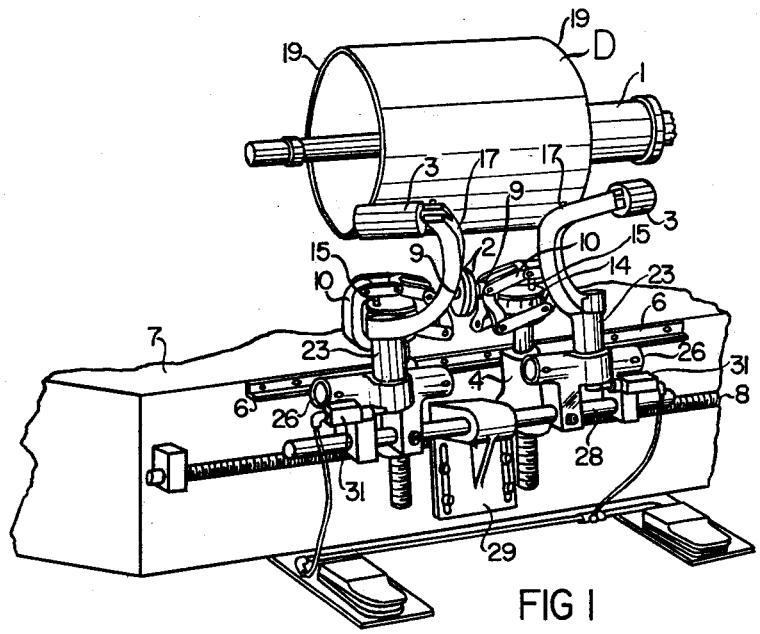
FIG. 1 is a perspective view of a tire building machine showing the stitching disks and the ply backup rolls in retracted positions with respect to the tire building drum.
Figure 2:
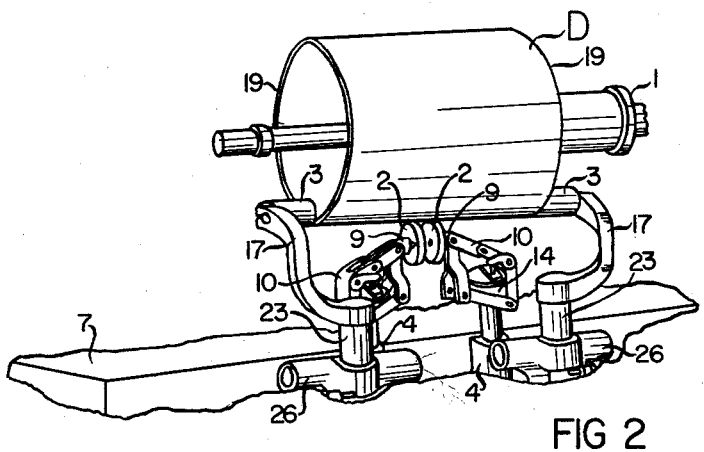
FIG. 2 is a perspective view similar to FIG. 1 except showing the ply stitching disks and backup rolls in operating position whereat they are positioned against the shoulders of the tire building drum with their axes parallel to the drum axis and with their outer surfaces tangent to the outer surface of the drum.

Referring now in detail to the drawings, and first to FIGS. 1 and 2, the tire building machine herein is shown as comprising a collapsible tire building drum D mounted on a drive shaft assembly 1 through which it is collapsed in conventional manner and through which it is periodically rotated when in uncollapsed condition for wrapping of successive plies P therearound. In FIGS. 1 and 2 only the tire building tools with which the present invention is concerned have been shown, namely, the tread stitching disks 2 which herein, in addition, are employed for performance of the ply stitching operation, and the ply backup rolls 3 which, in operating position as shown in FIG. 2, are adjacent to the ends of the drum D with their axes parallel to the drum axis and with their outer surfaces tangent to the outer surface of the drum D.

When the ply backup rollers 3 are in retracted position, as shown in FIG. 1, other tools (not shown) are free to be operated (a) to turn down the overhanging plies P, (b) to set the tire beads B against the turndowned plies P, (c) to flare out the turndowned plies P against the tire beads B, (d) to turn out the plies P to wrap them around the tire beads B, and (e) to stitch the tread stock on the plies P wrapped around the drum D.

For moving the stitcher disks 2 axially away from and toward each other, there are provided carriages 4 having a guide 5 engaged in a track 6 formed in the base 7 of the machine. Each carriage 4 has threaded engagement with a drive shaft 8 driven by a reversible drive motor (not shown). The drive shaft 8 has left-hand threads engaged with one carriage 4 and right-hand threads engaged with the other carriage 4 whereby, upon rotation of the drive shaft in opposite directions, the carriages 4 will move axially away from and toward each other.

Figures 7, 8:
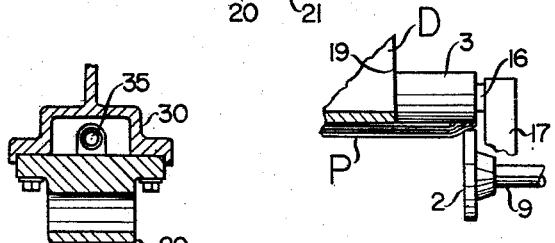
FIG. 7 is a cross-section view taken substantially along the line 7—7, FIG. 5.
FIG. 8 is a fragmentary radial cross-section view showing one of the stitcher disks and ply backup rolls, the latter being shown in operating position adjacent the end of the tire building drum with four plies being stitched together.

Each stitcher disk 2 is journalled on a shaft 9 of the parallelogram type linkage 10 on which the inflatable rubber bag or bellows 14 bears to yieldably press the disk 2 against the plies P wrapped around the drum D, whereby, as the associated stitcher carriage 4 moves from the middle of the drum D toward one end, the several plies P are stitched together. When the stitcher disks 2 move past the ends of the drum D as shown in FIG. 8, the plies P are stitched together while backed up by the corresponding ply backup rolls 3. The linkage 10 is provided with an adjustable stop 15 to limit the travel of the stitcher disk 2 toward the drum D to thereby preclude damage to the stock while yet letting the stitcher disks 2 yield in a radial direction with respect to the drum D due to variations in the thickness of the stock or to thickness buildup at the splices of the plies P.

Figure 3:
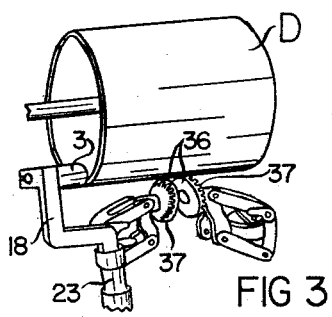
FIG. 3 is a fragmentary perspective view showing a modified form of support arm for a ply backup roll positioned adjacent the drum shoulder.

Insofar as the ply backup rolls 3 are concerned, they are supported on suitable antifriction bearings on the shaft 16 at the end of a curved arm 17 or angular arm 18 (see FIGS. 1–2, and FIG. 3 respectively). Each arm 17 or 18 is bifurcated at its upper end for axial adjustment and clamping of the roller-supporting shaft 16 so that when the arm 17 or 18 is swung to operating position, the end of the backup roller 3 will be in close proximity to the corresponding end or shoulder 19 of the drum D. The lower end of the arm 17 or 18 is secured on the upper end of a shaft 20 which has a gear 21 in the housing 23 meshing with the gear rack 24 formed on the double-ended piston 25, the latter being reciprocable in opposite directions by fluid under pressure admitted selectively into opposite ends of the cylinder 26. An adjustable stop 27 is provided on the housing 23 which is engaged by the side of the arm 17 or 18 when the backup roll 3 is in proper operating position with its axis parallel to the axis of the drum D.

Each housing 23 is mounted in inclined position and for longitudinal adjustment on the shaft 28 whereby the housings 23 may be shifted horizontally along said shaft 28 according to the axial length of the drum D.

In order to use the present inventions with drums D of different diameters, the shaft support or slide 29 is mounted on a vertical guide 30 so that the backup rolls 3 may be adjusted up or down to correspond with the diameter of the drum D.

When the ply backup rolls 3 are in retracted position suitable switches 31 will be actuated by the cams 32 on shafts 20 to initiate subsequent operations of the tire building machine such as shown, for example, in the patent to T. C. Jones, Pat. No. 2,555,343, dated June 5, 1951.

Vertical adjustment of the shaft 28 may be effected as by means of the screw 34 which, for example, is rotatable, but axially fixed, in the ear 35 of slide 29 and which has threaded engagement with the support 29 whereby turning of the screw 34 in opposite directions will raise or lower the shaft support 29 and shaft 28.

In operation, the leading edge of a piece of ply stock P will be placed on the drum D, whereupon the drum D will be rotated one full revolution to cause wrapping of the stock P therearound. The drum D may be then indexed and the next piece of ply stock P wrapped one full turn around (with its cords angularly disposed with respect to the cords of the first ply). As many plies P as desired may be wrapped around the drum D in this manner with the splices staggered for balanced construction. As shown in FIG. 8 each successive ply P may be of greater width than the preceding ply. The operator then depresses a foot pedal or the like, (unless the machine is fully automatic) which actuates a valve to admit air into the outer ends of the cylinders 26 to cause swinging of the arms 17 or 18 to position the ply backup rolls 3 inside the overhanging plies P and in line with the stitcher disks 2. At the same time, such depression of the foot pedal, admits air into the bellows 14 to move the stitcher disks 2 up into yieldable engagement with the plies P. At this time, the drive shaft 8 is power driven to cause the stitcher disks 2 to move axially apart from the middle of the drum P to progressively stitch the plies P together. When the stitcher disks 2 pass the ends of the drum D, the plies P are stitched together against the backup rolls 3, the drum D being continuously rotated at this time.

When the aforesaid ply stitching operation has been completed, the carriages 4 may trip a switch to actuate a control valve to admit air into the inner ends of the cylinders 26 and to vent the bellows 14, whereby the ply backup rolls 3 are moved to withdrawn position, and the stitcher disks 2 drop radially outward out of engagement with the plies P. At the same time, the stitcher drive shaft 8 will be power driven in the opposite direction to return the disks 2 to positions at the middle ready for subsequent engagement with tread stock to be wrapped around the drum D.

Stitcher disks 2 of the type shown in FIGS. 1 and 2 with their axes disposed parallel to the drum axis are preferred but, in some cases, canted stitcher disks 36 with conical ribs 37 may be employed as shown in FIG. 3.

With reference to FIG. 8, the overhang of the plies P is considerably more than normal and such as to require previous stitching together to avoid the formation of pin wrinkles and to provide higher ply locks. Thus, the overhang of the plies P is sufficient not only to completely wrap over the bundle of bead wires 38 of beads B but also to extend well over the shoulders 19 of the drum D to retain high strengths in the bead areas despite the absence of the usual flipper strips on the tire beads B.

The present invention also lends itself to the building of tires by the "single ply" method i.e., without need of first applying, say, two plies P which are turned down, then applying the beads B, turnup of the two plies P, applying the third and fourth plies P, and turning down and tucking under thereof around the beads B.

In the present case, it is preferred to use plain metal disks 2, but it is, of course, to be understood that said disks 2 may have rubber-like rims to reduce the effect of "bounce" of the disks 2 on the drum D and to decrease the possibility of damage to plies P. Moreover, the air pressure in the bellows 14 is relatively low to preclude damage to the plies P.

Figure 4:
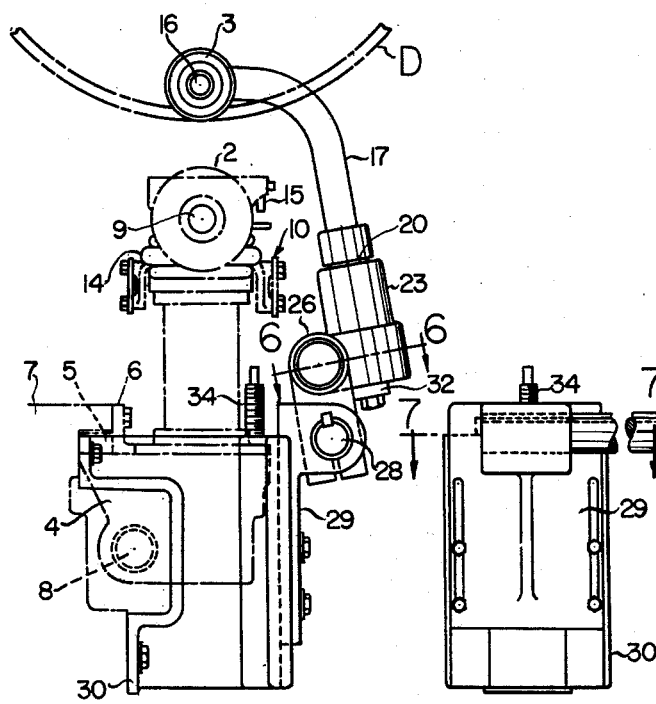
FIG. 4 is an end elevation view showing one ply backup roll and its supporting arm in operating position against an end of the tire building drum, the stitcher disk and its carriage and the drum being shown in phantom.
Figure 5:
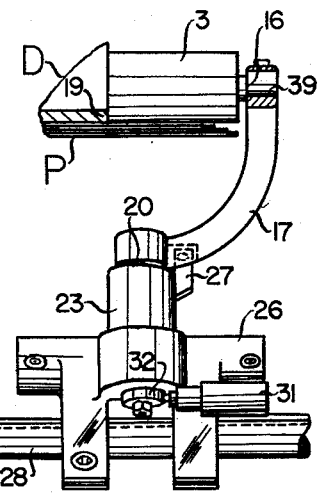
FIG. 5 is a front elevation view as viewed from the right-hand side of FIG. 4.
Figure 6:
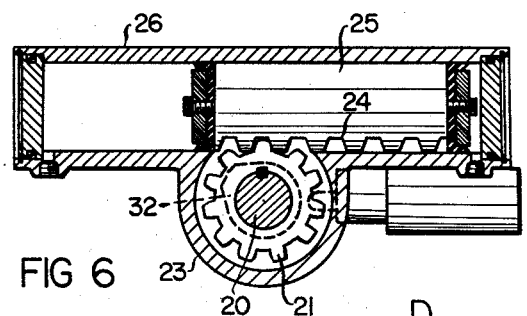
FIG. 6 is a cross-section view taken substantially along the line 6—6, FIG. 4 showing the actuating means for swinging the ply backup roll between operating position and retracted position.
Figure 9:
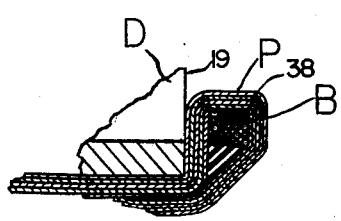

Although the rolls 3 are shown in FIGS. 4 and 5 as being tangent to the outer surface of the drum D and in alignment with the centerline of the stitcher disks 2, is to be understood that, in some instances, it may be preferred to adjust the rolls 3 so that their centerlines are offset to either side of the stitcher centerline. To accomplish such adjustment of the rolls 3, the supporting shafts 16 have eccentric portions 39. Moreover, the rolls 3 may be radially adjusted if it is desired to have them in other than a tangent relation to the outer surface of the drum.

Other modes of applying the principle of the invention may be employed, change being made as regards the details described, provided the features stated in any of the following claims, or the equivalent of such, be employed.

We therefore particularly point out and distinctly claim as our invention:

1. A ply stitching device for use with a tire building drum which is periodically rotated for wrapping of successive layers of ply stock therearound in axially overhanging relation to the ends of the drum, said device comprising a support structure; stitching means mounted on said structure for movement toward the drum to contact plies therearound and for movement axially of the drum, means mounting said stitching means for movement axially of said drum; ply backup means mounted on said structure, and means mounting said ply backup means for movement around the ends of the drum to operating positions inside the overhanging ends of the plies and adjacent the ends of the drum whereby the overhanging ends of the plies are stitched together as said stitching means travel axially beyond the ends of the drum, each backup means comprising a roll which, when in operating position, has its outer surface substantially tangent to the outer surface of the drum, said means mounting said ply backup means comprising an arm having said roll journalled on one end thereof and having its other end rotatable in said support about an axis which is offset from, and disposed at an angle to the axes of said roll and drum.

2. The device of claim 1 wherein the portion of said arm adjacent said other end includes a portion which is normal to its support axis and generally parallel to the axis of said roll.

3. The device of claim 1 wherein said arm, between its ends has angularly related portions to permit movement of the associated stitching means therepast.

4. The device of claim 1 wherein the axis of rotation of said other end of said arm is disposed so that, upon rotation thereof for retraction of said backup means from operating position, said roll has a compound swinging movement moving said roll simultaneously longitudinally axially outwardly and radially inwardly with respect to the overhanging plies.

5. A ply stitching device for use with a tire building drum which is periodically rotated for wrapping of successive layers of ply stock therearound in axially overhanging relation to the ends of the drum, said device comprising a support structure; stitching means, means mounting said stitching means on said structure for movement toward the drum to contact plies therearound, means mounting said stitching means on said structure for movement axially of said drum; ply backup means mounted on said structure, arm means mounting said ply backup means for movement around the ends of the drum to operating positions inside the overhanging ends of the plies and adjacent the ends of the drum whereby the overhanging ends of the plies are stitched together as said stitching means travel axially beyond the ends of the drum, and pivot means mounting said arm means on said support structure operative to swing said backup means from operating position in an arc around the edge of the drum to a retracted position outside the periphery of the drum.

References Cited in the file of this patent

UNITED STATES PATENTS

| | | |
|---|---|---|
| 2,239,453 | Bostwick | Apr. 22, 1941 |
| 2,339,551 | Stevens | Jan. 18, 1944 |
| 2,537,649 | Smith | Jan. 9, 1951 |
| 2,936,023 | Giletta | May 10, 1960 |